UNITED STATES PATENT OFFICE.

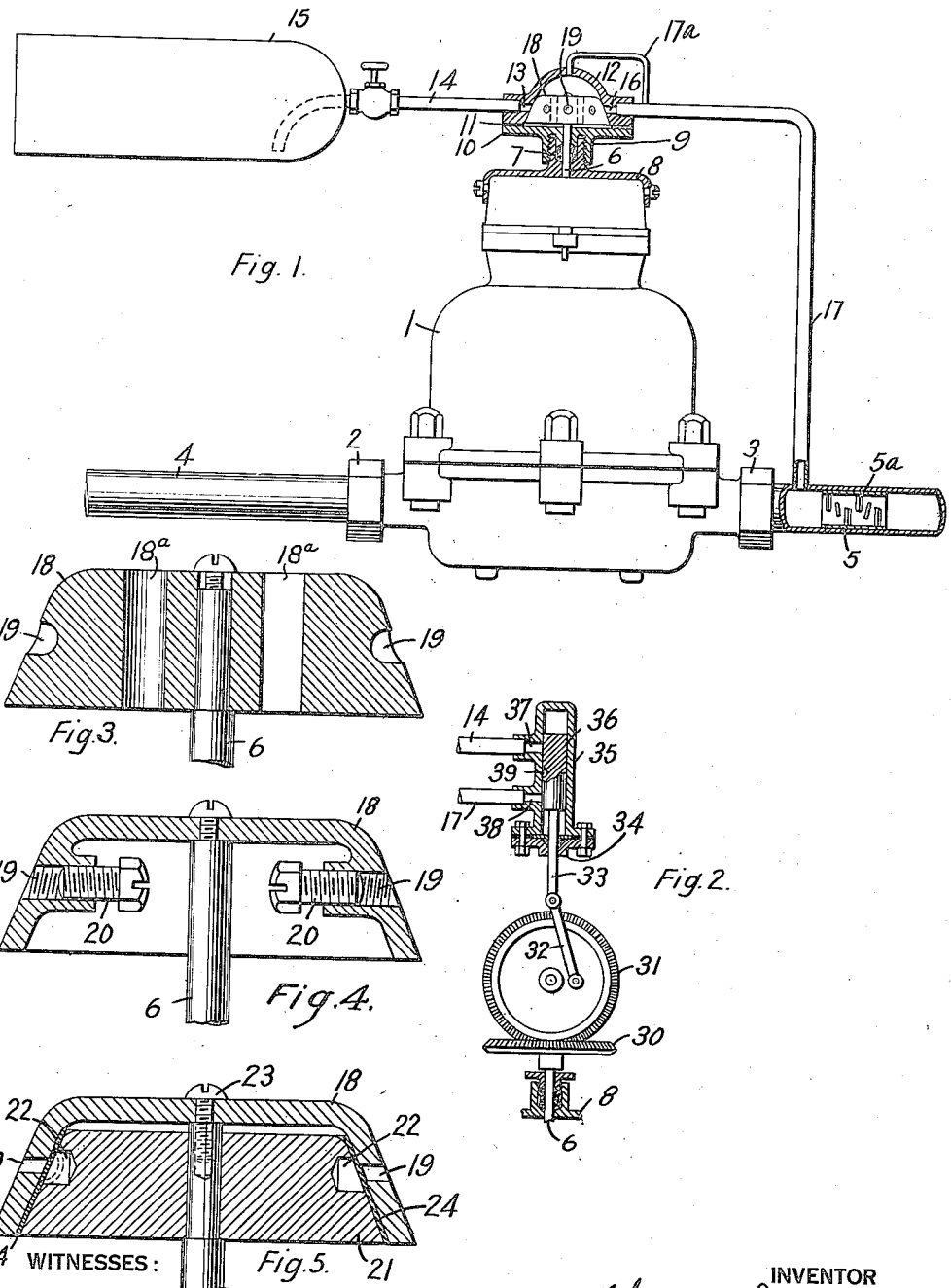

WALTER O. SNELLING, OF PITTSBURGH, PENNSYLVANIA.

APPARATUS FOR MIXING FLUIDS.

1,378,384.   Specification of Letters Patent.   Patented May 17, 1921.

Applicaton filed October 14, 1915. Serial No. 55,753.

*To all whom it may concern:*

Be it known that I, WALTER O. SNELLING, a citizen of the United States, and a resident of Pittsburgh, in the county of Allegheny and State of Pennsylvania, have invented a new and useful Improvement in Apparatus for Mixing Fluids, of which the following is a specification.

My invention relates to apparatus for mixing fluids in definite proportions, and has special reference to apparatus for purifying water by adding to it definite and predetermined amounts of chlorin, or other water-sterilizing liquid or gas.

The general object of my invention is to provide a simple device which shall be capable of mixing fluids in perfectly definite and regulable proportions, and which shall operate by successively isolating small portions of a fluid maintained under a relatively high pressure and bringing such isolated portions into contact with another fluid maintained under a lower pressure.

More particularly, my invention aims to provide a device which shall be capable of effectively and accurately mixing equal and regularly delivered amounts of chlorin with flowing supplies of water and which, when operated continuously for long periods of time, shall not be liable to injury from corrosion or from other causes.

The details of my invention will be described in connection with the accompanying drawing, in which Figure 1 is a side view, partly in elevation and partly in section, showing one form of apparatus, constructed in accordance with my invention, for mixing chlorin with water; Fig. 2 is a side view, partly in elevation and partly in section, showing another form of mixing device; Fig. 3 is a vertical sectional view of a member that forms a part of the apparatus shown in Fig. 1, and Figs. 4 and 5 are vertical sectional views, similar to Fig. 3, illustrating modifications of the structure shown in Fig. 3.

The efficacy of chlorin as a sterilizing agent for the treatment of water is well recognized, and not only is water frequently sterilized with chlorin in times of disease epidemics, but the addition of chlorin to drinking water has been applied on a very large scale, and in a permanent way, to the purification of the water supplies of towns and large cities. The use of this very effective sterilizing agent has hitherto been restricted by the very great difficulty which has been experienced in delivering the chlorin to the water in the proper amounts and at the proper times.

For sterilizing purposes, chlorin may be mixed with water either as a liquid or as a gas, and may conveniently be obtained and handled as a liquid in the familiar commercial bottles, from which the gas may be liberated as required. In practice, however, it is found that the corrosive action of the chlorin rapidly impairs the accuracy of the reducing valves and like appliances which have heretofore been required for liberating chlorin from bottles of the liquid in the exceedingly small amounts that are required and for mixing it with water under much lower pressures. By my present invention, I wholly avoid the use of reducing valves and other apparatus of a delicate nature, and I am able to supply chlorin-treated water of very great uniformity, the amount of chlorin per million parts of water being uniform to an extent which has never before been attainable.

I prefer to mix the chlorin with a moving stream of water, and I utilize the movement of the water to isolate successive portions of liquid or gaseous chlorin, and to liberate such isolated amounts in contact with the flowing stream. Since the successive additions of chlorin are equal in quantity and are made at equal intervals of current flow, controlled by the movement of the water itself, the amount of chlorin added to the water is exactly proportional to the amount of water flowing.

For a better understanding of my invention, reference may now be had to the accompanying drawing, Fig. 1 of which shows a device comprising a water meter 1, provided with inlet and outlet ports 2 and 3, to which are respectively connected a supply pipe 4 and an outlet pipe 5. The outlet pipe 5 is preferably provided with suitable mixing baffles 5ª. The meter 1 is intended to illustrate any desired form of device connected to a water supply pipe and adapted to be regularly moved by the flowing water. This device may be a small turbine, for example, and may have no metering function, but since it is usual to measure the water delivered by supply systems, I find it convenient to combine my chlorin mixing device with the meter.

The type of meter shown in Fig. 1 includes a central vertical shaft 6 which, for my present purpose, is extended above the meter casing and through a gland or stuffing-box 7 carried by a member 8 which conforms in shape to the top of the meter 1 and is rigidly attached thereto. The member 8, adjacent to the gland 7, is provided with screw threads that are engaged by an interiorly screw-threaded flanged annulus 9, the horizontal flange 10 of which supports, through a gastight packing 11, a generally cone-shaped casing 12 which is clamped to the flange 10 in any suitable manner. The casing 12 is provided with an inlet port 13, which may be connected by means of a pipe 14 to a chlorin bottle 15, and with an outlet port 16, which should be connected to the outlet pipe 5 of the meter 1, suitably by means of a pipe 17. The interior of the casing 12 is also connected to the pipe 17 through a capillary by-pass tube 17$^a$.

Rigidly attached to the upper end of the vertical shaft 6, is a frusto-conical member 18, the inclined surface of which fits closely but rotatably within the casing 12. The member 18 is provided with vertical passages 18$^a$ and with one or more peripheral recesses 19, which may merely be superficial depressions or grooves, as shown in Fig. 3, but which are preferably so formed that their effective volume may be changed at will. Such an arrangement of adjustable recesses is illustrated in Fig. 4, which shows a hollow frusto-conical member 18 provided with inwardly projecting lugs which are tapped to receive screw bolts 20.

The upper edge of the frusto-conical member 18 is preferably rounded off in order that it may advance slightly into the casing 12 to compensate for wear and maintain its tight fit. The flanged annulus 9 may occasionally be turned slightly, in order to force the casing 12 into closer engagement with the member 18.

In practice, it is usually desirable to mount the member 18 on a separate shaft, driven from the meter shaft 6 through suitable reduction gearing, since only very small amounts of chlorin are required in proportion to the amount of water flowing, and therefore the member 18 may make one revolution during several revolutions of the meter. For the sake of simplicity, however, the member 18 is shown on the accompanying drawing attached directly to the shaft 6.

In the operation of the device described above, the mechanism of the meter 1 is rotated proportionally to the flow of water through it. This rotation is imparted through the shaft 6 to the member 18, and at each revolution of the member 18 each of the recesses 19 is presented first to the inlet port 13, where it is filled with chlorin under relatively high pressure, and next to the outlet port 16, where the pressure is materially less. Consequently, when each recess 19 registers with the outlet port 16, the chlorin expands greatly, and a definite part of it passes through the pipe 17 and is at once absorbed by the water which flows in the pipe 5. The water may rise considerably in the pipe 17. It will be observed that there is never a free path of communication between the chlorin bottle 15 and the waterpipe 5, and that the chlorin may therefore be supplied to the inlet port 13 at its full pressure. It will also be evident that the amount of chlorin transferred to the water is in exact proportion to the amount of water flowing. Thus, if the meter shaft 6 makes one revolution for each 100 gallons of water, the chlorin-carrying member 18 likewise makes one revolution for 100 gallons of water, and the size of the recesses 19 should be so adjusted that at each revolution the exact amount of chlorin is delivered to treat the water with the desired number of parts of chlorin per million parts of water.

During the continuous operation of the device for long periods, a very small amount of chlorin may escape between the member 18 and the walls of the casing 12. If this should occur, the chlorin so escaping passes at a regular rate through the capillary tube 17$^a$ into the pipe 17. Such leakage is almost negligible in amount, but if allowed to accumulate, enough pressure might eventually be set up to cause a more serious leakage.

Another form of rotating frusto-conical member is shown in Fig. 5, in which the member 18 is made in the form of a hollow shell, the peripheral openings 19, in this case, extending through the shell. An inner, solid member 21, provided with larger depressions 22 which register with the perforations 19, is fitted tightly within the shell 18, and is held in place by means of a screw 23, passing through the shell 18 and into the end of the shaft 6. Between the member 21 and the shell 18 is disposed a thin strip of copper or other slightly elastic material 24, which is tightly clamped between the members 18 and 21 at all points except at the registering openings 19 and 22. This form of device may be modified by providing small and slightly elastic metallic chambers or bottles within the hollow member 18, the constricted neck of one of these bottles being disposed opposite each of the peripheral openings 19.

When the rotating member 18 is constructed in the manner shown in Fig. 5, or in any other manner which provides a resilient chamber for receiving high-pressure liquid, each chamber is filled with liquid through the inlet port 13 and is expanded, the resilient wall taking a position which is shown, much exaggerated, in dotted lines at the left of Fig. 5. Further motion of the apparatus shuts off the filled chamber from communication with the high-pressure liquid supply and carries it to the low-pressure outlet port. Here the resilient wall of the chamber contracts, and discharges a portion of the contents of the chamber through the outlet port 16, the volume of the portion of liquid thus transferred being equal to the difference in volume of the chamber under the two pressures. This resilient structure is of special advantage when a high-pressure liquid, not readily volatile under reduced pressure, is to be mixed with another fluid.

Another form of fluid-transferring device is illustrated in Fig. 2 of the drawing, in which a vertical shaft 6 and high pressure fluid inlet and outlet pipes 14 and 17 correspond to the similarly designated parts in Fig. 1. The shaft 6 carries a bevel gear wheel 30, meshing with a bevel gear wheel 31, which is supported in any suitable manner and which carries a crank pin 32 attached, through a connecting link 32, to a reciprocating rod 33. This mechanism for reciprocating the rod 33 in proportion to the rotation of the shaft 6 may of course be varied in many ways. The rod 33 extends through a suitable stuffing box 34 into a cylinder 35, and is connected to a solid piston-like member 36, which closely fits within the cylinder 35 and is reciprocable therein. The cylinder 35 is provided with an inlet port 37 and an outlet port 38, which communicate, respectively, with the inlet and outlet pipes 14 and 17. A recess or groove 39 is formed in the member 36, as shown, and the position of this recess and the stroke of the member 36 are so selected that the recess 39 is presented to the inlet port 37 at one end of the stroke, and, at the other end, to the outlet port 38. If the inlet pipe 14 is connected to a source of chlorin under high pressure, and if the outlet pipe 17 is connected to a source of water supply under a lower pressure, it is evident that the recess 39 will isolate a definite amount of chlorin at each stroke of the piston, and will deliver this chlorin to the water supply through the pipe 17.

My invention is by no means confined to mixing chlorin with water, but may also be applied in mixing many other fluids, both liquid and gaseous. Also, many devices, other than those specifically shown and described, may be devised for utilizing the principles of my invention, and I therefore desire that no limitations be imposed upon my invention except such as are indicated in the appended claims.

I claim as my invention:

1. Apparatus for mixing fluids comprising a member defining a passage through which a stream of fluid flows, and means operable in response to the flow of fluid in the said passage and adapted to deliver isolated and predetermined quantities of another fluid into the said flowing fluid, maintained under higher pressure.

2. Apparatus for mixing fluids comprising a source of fluid under one pressure, a source of fluid under a lower pressure, a member defining a fluid-receiving chamber, and means operated by the flow of the liquid under lower pressure for moving the said chamber into communication alternately with the said sources of fluid.

3. Apparatus for mixing fluids comprising means for bringing near together, but wholly out of direct communication, a fluid under one pressure and a fluid under a lower pressure, and means for segregating predetermined quantities of the fluid under the higher pressure and for delivering such portions to the fluid under the lower pressure.

4. Apparatus for mixing fluids comprising a member adapted to be moved in a predetermined and regular manner by a flowing body of fluid, and another member actuated by the first member and provided with means for segregating, at regular intervals, predetermined quantities of another fluid under higher pressure, and for bringing such quantities of fluid into contact with the said first-named fluid.

5. Apparatus for mixing fluids comprising a stationary casing provided with a plurality of ports, a plurality of sources of fluids under different pressures, communicating respectively with the said sources of fluids, and a member movable within the casing and provided with means for receiving a predetermined quantity of fluid from one port and delivering the said quantity of fluid through another port communicating with a fluid under a lower pressure.

6. Apparatus for mixing fluids comprising a stationary casing having conically inclined interior walls and provided with inlet and outlet ports, and a rotatable member of frusto-conical form fitting closely within the said casing, the said rotatable member being provided with a recess having a single opening adapted to register alternately with the said ports during the rotation of the said member.

7. Apparatus for mixing fluids comprising a stationary casing having conically inclined interior walls and provided with inlet and outlet ports, a rotatable member of frusto-conical form fitting closely within the said casing, the said rotatable member being provided with a recess adapted to register alternately with the said ports during the rotation of the said member, and means for varying the volume of the said recess.

8. Apparatus for mixing fluids comprising a stationary casing having conically inclined interior walls and provided with inlet and outlet ports, and a rotatable member of frusto-conical form fitting closely within the said casing, the said rotatable member being provided with a screw-threaded recess adapted to register alternately with the said ports during the rotation of the said member, and a screw coöperating with the said recess to vary its effective volume.

9. Apparatus for mixing fluids comprising a stationary casing having conically inclined interior walls and provided with inlet and outlet ports, the said inlet port being connected to a source of fluid under relatively high pressure, and the said outlet port being connected to a chamber adapted to contain a flowing stream of fluid under a lower pressure, a shaft adapted to be rotated by the movement of the said flowing stream and a rotatable member of frusto-conical form attached to the said shaft and fitting closely within the said stationary casing, the said rotatable member being provided with at least one recess in its conical periphery adapted to register alternately with the said ports during the rotation of the said frusto-conical member.

10. Apparatus for purifying liquids comprising a meter for registering the flow of the liquid to be purified, a member adapted to be moved in response to the registering movement of the said meter, a casing surrounding the said member and provided with inlet and outlet ports communicating respectively with a source of purifying fluid and with the liquid to be purified, and means associated with the said member for receiving a predetermined amount of purifying fluid from the said inlet port and conveying it to the said outlet port.

11. Apparatus for purifying liquids comprising a meter for registering the flow of the liquid to be purified, a member adapted to be moved in response to the registering movement of the said meter and provided with a peripheral depression of variable volume, and a casing surrounding the said member and provided with inlet and outlet ports communicating respectively with a source of purifying fluid and with the liquid to be purified.

12. Apparatus for purifying liquids comprising a meter for registering the flow of the liquid to be purified, a rotary member adapted to be rotated in response to the registering movement of the said meter and provided with a peripheral depression of regulable volume, and a casing closely surrounding the said member and provided with inlet and outlet ports communicating respectively with a source of purifying fluid and with the liquid to be purified.

13. Apparatus for purifying liquids comprising means for bringing near together but out of direct communication a supply of liquefied purifying gas and a body of the liquid to be purified, and means for segregating successive equal portions of the said liquid and for bringing the said segregated portions into contact with the liquid to be purified.

14. Apparatus for purifying liquids comprising means for bringing near together but out of direct communication a supply of liquefied chlorin and a body of the liquid to be purified, and means comprising a rotary conveyer for segregating successive small portions of the said liquid chlorin and for bringing the said segregated portions into contact with the liquid to be purified.

In testimony whereof, I have hereunto subscribed my name this 6th day of October, 1915.

WALTER O. SNELLING.

Witnesses:
  M. R. McKEOWN,
  J. G. KAISER.